(12) United States Patent
Hu et al.

(10) Patent No.: US 11,533,912 B2
(45) Date of Patent: Dec. 27, 2022

(54) USE OF CINNAMATE COMPOUNDS IN THE CONTROL OF FUNGAL DISEASES OF CROPS

(71) Applicant: Institute of Plant Protection, Gansu Academy of Agricultural Sciences, Lanzhou (CN)

(72) Inventors: Guanfang Hu, Lanzhou (CN); Yuling Wang, Lanzhou (CN); Yingqian Liu, Lanzhou (CN); Haitao Yu, Lanzhou (CN); Shujun Niu, Lanzhou (CN); Minyan Liu, Lanzhou (CN); Feng Zhao, Lanzhou (CN)

(73) Assignee: INSTITUTE OF PLANT PROTECTION, GANSU ACADEMY OF AGRICULTURAL SCIENCES, Lanzhou (CN)

( * ) Notice: Subject to any disclaimer, the term of this patent is extended or adjusted under 35 U.S.C. 154(b) by 155 days.

(21) Appl. No.: 16/927,088

(22) Filed: Jul. 13, 2020

(65) Prior Publication Data

US 2021/0137110 A1    May 13, 2021

(30) Foreign Application Priority Data

Nov. 11, 2019   (CN) .......................... 201911093363.3

(51) Int. Cl.
*A01N 43/30* (2006.01)
*A01N 37/38* (2006.01)

(52) U.S. Cl.
CPC ............. *A01N 43/30* (2013.01); *A01N 37/38* (2013.01)

(58) Field of Classification Search
CPC ........ C07C 69/732; A01N 43/30; A01N 37/38
See application file for complete search history.

(56) References Cited

U.S. PATENT DOCUMENTS 6,020,332 A     2/2000 Li et al.
2011/0263420 A1 * 10/2011 Daniels .................. A01N 37/46
                                                                     504/103

FOREIGN PATENT DOCUMENTS

CN        1167568 A      12/1997
EP        0860438 A       8/1998
WO     WO 02/15691    *  2/2002
WO     WO 2017/220565 * 12/2017

OTHER PUBLICATIONS

Lurik et al. (Synergists of insecticides.III, Synthesis of ethyl cis-(3,4-methylenedioxy)cinnamate, vol. 9, Issue 6, pp. 367-371) (Year: 1975).*

Design, Synthesis, and Biological Activity of a Novel Lead Compound 4-[4-(3,4-Dimethoxphenyl)-2-methylthiazole-5-carbonyl]morpholine; Liu Chang-Ling, Li Zheng-Ming; vol. 43 No. 4 Apr. 2004; 3 pages.
Novel Fungicide Flumorph (SYP-L190) With High Activity; Liu Wucheng et al.; 4 pages; Pesticides vol. 41 No. 1 (2002).
Self-Inhibitor of Bean Rust Uredospores: Methyl 3,4-Dimethoxycinnamate; 2 pages; V. Macko, R.C. Staples, H. Gershon, J.A.A. Renwick; Boyce Thompson Institute, Yonders, NY 10701; Aug. 1970; revised Sep. 10, 1970.
Specific Activity of Synthesized Analogs of Germination Self-inhibitors from Urediniospores of the Oat Rust Fungus; Tetsu Tsurushima, Tamio Euno, Hiroshi Fukami, Kohei Matsumoto, Tetsuya Takahashi, Yoshiyuki Hayashi, Hiroshi Irie; 62:222-226 (1996); Ann. Phytopathol. Soc.; 5 pages.

* cited by examiner

*Primary Examiner* — Johann R Richter
*Assistant Examiner* — Danielle Sullivan
(74) *Attorney, Agent, or Firm* — Shumaker, Loop & Kendrick, LLP; James D. Miller

(57) ABSTRACT

A method of controlling fungal diseases of crops with cinnamate compounds, the cinnamate compounds having one of the following chemical structures:

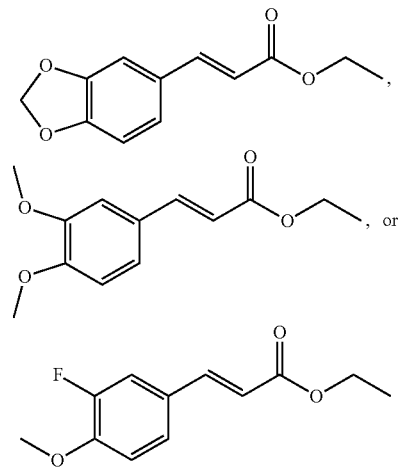

wherein the cinnamate compounds exhibit strong antifungal activities, have a broad antifungal spectrum against pathogenic fungi of crops, are safe for crops, can avoid the occurrence of phytotoxicity, and can be used for the control of fungal diseases of crops such as powdery mildew, damping-off, rot, gummy stem blight, anthracnose, white rot, northern leaf blight, late blight, gray mold, downy blight, blight, early blight, *Fusarium* wilt, full rot, *Pythium* rot, dry rot, ring spot, sheath blight, stalk break and the like, the field efficiencies of which are superior to or comparable to that of the control compound, methyl 3,4-dimethoxy cinnamate.

2 Claims, No Drawings

USE OF CINNAMATE COMPOUNDS IN THE CONTROL OF FUNGAL DISEASES OF CROPS

CROSS-REFERENCE TO RELATED APPLICATIONS

This patent application claims priority to Chinese Patent Application No. 201911093363.3 filed on Nov. 11, 2019, the disclosure of which is incorporated herein by reference in its entirety.

TECHNICAL FIELD

The present invention relates to the technical field of pesticides, and particularly relates to a use of cinnamate compounds in the control of fungal diseases of crops.

BACKGROUND

As early as in 1970, Staples et al. have reported that an derivative of cinnamic acid, methyl 3,4-dimethoxy cinnamate, has fungicidal activity, its cis-isomers have been used as pesticides in Japan, while its trans-isomers are almost inactive [①Staples M. V, et al. Sci., 1970, 170:539-540; ②Tetsu, T. et al. Ann. Phytopathol. Soc. Jpn., 1996, 62:222-227]. In the 1980s, researchers in Shell Co. have successfully developed a fungicide, dimethomorph, based on methyl 3,4-dimethoxy cinnamate, likewise, its cis-isomers are active [①Tetsu T., et al. Ann. Phytopathol. Soc. Jpn., 1996, 62:222-227; ②Albert A. et al. Brighton: British Crop Prot. Council, 1988, 17-23]. Although it was reported in documents that dimethomorph had good protective and therapeutic activities, actually its therapeutic activity was poor [①Albert A. et al. Brighton: British Crop Prot. Council, 1988, 17-23; ②Liu Changling, et al. Brighton: British Crop Prot. Council, 2000, 549-556]. Shenyang Research Institute of Chemical Industry developed a new fungicide, flumorph, based on methyl 3,4-dimethoxy cinnamate and dimethomorph, of which the activity, especially the therapeutic activity was significantly superior to that of dimethomorph, its cis- and trans-isomers are both active [①Li Zongcheng et al., Chinese Patent: 96115551.5, 1994-04-08b, U.S. Pat. No. 6,020,332, 2000-0201c, EU Patent: 860438B, 2003-01-08; ②Liu Changling, et al. Brighton: British Crop Prot. Council, 2000, 549-556; ③Liu Wucheng et al., A new high effective fungicide flumorph, Pesticides, 2002, (1): 8-12]. In addition to dimethomorph and flumorph, there are many analogues [Liu Changling, Collection of new pesticide research and development, Beijing: Chemical Industry Press, 2002, 58-61], which have been developed at present including fenpropimorph, tridemorph, dodemorph and pyrimorph and so on.

Powdery mildew is the main disease of a variety of crops in China, such as wheat, barley, flax, melon vegetables, rape, beans, pepper, tomato, eggplant, grape, strawberry, apple, flowers, and Chinese medical herbs, which is serious in rainy years, prone to outbreak, and need multiple controls. And if the optimum control period is missed, the control would be poor or ineffective, which has become an urgent problem in production. The fungicides currently used for the control of powdery mildew in production include triazoles, morpholines and methoxy acrylates. The triazoles include triazolone, difenoconazole, tebuconazole, flusilazole, diniconazole, propiconazole, flutriafol, hexaconazole, myclobutanil, triadimenol and the like. Drug resistance has developed as a result of long-term continuous use, and most varieties easily cause phytotoxicities to crops due to improper use, thus inhibiting the normal growth of crops.

SUMMARY

According to the above prior art, the present invention aims to provide a new use of cinnamate compounds in the control of fungal diseases of crops.

For the above purposes, the present invention employs the following technical solution:

A use of cinnamate compounds in the control of fungal diseases of crops, wherein:

the cinnamate compound is ethyl 3-(3',4'-methylene dioxy phenyl) acrylate, the chemical structure of which is as below:

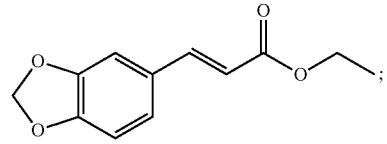 [SMILES: CCOC(=O)/C=C/c1ccc2c(c1)OCO2]

alternatively, the cinnamate compound is ethyl 3-(3',4'-dimethoxy phenyl) acrylate, the chemical structure of which is as below:

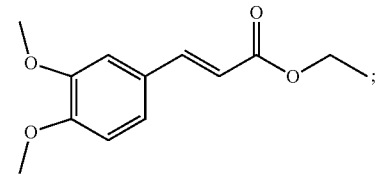 [SMILES: CCOC(=O)/C=C/c1ccc(OC)c(OC)c1]

alternatively, the cinnamate compound is ethyl 3-(3'-fluoro-4'-methoxy phenyl) acrylate, the chemical structure of which is as below:

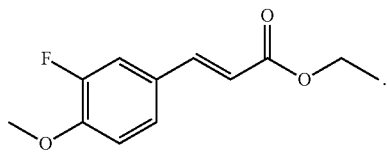 [SMILES: CCOC(=O)/C=C/c1ccc(OC)c(F)c1]

Preferably, the fungal disease is at least one of powdery mildew, damping-off, rot, gummy stem blight, anthracnose, white rot, northern leaf blight, late blight, gray mold, downy blight, blight, early blight, *Fusarium* wilt, full rot, *Pythium* rot, dry rot, ring spot, sheath blight, and stalk break.

Preferably, the crop is at least one of apple, watermelon, grape, cotton, corn, wheat, rice, potato, rape, marrow bean, cucumber, zucchini, melon, cucurbit, opo squash, white gourd, and solanceous vegetables. The solanceous vegetables are, for example, pepper, tomato, eggplant and the like.

Preferably, the ethyl 3-(3'-fluoro-4'-methoxy phenyl) acrylate is used as an antifungal active ingredient in the preparation of a fungicide for the control of powdery mildew of crops.

Preferably, the ethyl 3-(3',4'-methylene dioxy phenyl) acrylate is used as an antifungal active ingredient in the preparation of a fungicide for the control of powdery mildew of crops.

Preferably, the ethyl 3-(3',4'-dimethoxy phenyl) acrylate is used as an antifungal active ingredient in the preparation of a fungicide for the control of powdery mildew of crops.

Preferably, the ethyl 3-(3'-fluoro-4'-methoxy phenyl) acrylate is used as an antifungal active ingredient in the preparation of a fungicide for the control of damping-off of solanceous vegetables.

Preferably, the ethyl 3-(3',4'-methylene dioxy phenyl) acrylate is used as an antifungal active ingredient in the preparation of a fungicide for the control of damping-off of solanceous vegetables.

Preferably, the ethyl 3-(3',4'-dimethoxy phenyl) acrylate is used as an antifungal active ingredient in the preparation of a fungicide for the control of damping-off of solanceous vegetables.

A fungicide, comprising ethyl 3-(3',4'-methylene dioxy phenyl) acrylate as an antifungal active ingredient A, and comprising metalaxyl or hymexazol as an antifungal active ingredient B.

Preferably, the mass ratio of the antifungal active ingredient A to the antifungal active ingredient B is 1:3 to 3:1.

Preferably, the fungicide is used for the control of pepper downy blight.

The cinnamate compounds of the invention have a broad antifungal spectrum against fungal diseases of crops, are safe for crops, and can avoid the occurrence of phytotoxicity.

DESCRIPTION OF THE EMBODIMENTS

The specific technical scheme of the invention is further detailed below through specific embodiments. The following are only some specific embodiments of the invention. It is obvious that the invention is not limited to the following embodiments and may have many variations. All the variations which can be directly derived or associated with the disclosed contents of the invention by those of ordinary skills in the art shall be considered as the protection scope of the invention.

The present invention relates to the technical field of pesticides, and particularly relates to a use of cinnamate compounds in the control of fungal diseases of crops.

Embodiment 1: Determination on the Antifungal Activities of ethyl 3-(3'-fluoro-4'-methoxy phenyl) acrylate, ethyl 3-(3',4'-methylene dioxy phenyl) acrylate, ethyl 3-(3',4'-dimethoxy phenyl) acrylate and the Control Compound A Ex Vivo (1) Agents for Testing Ethyl 3-(3'-fluoro-4'-methoxy phenyl) acrylate (at a purity of 99%), ethyl 3-(3',4'-methylene dioxy phenyl) acrylate (at a purity of 99%) and ethyl 3-(3',4'-dimethoxy phenyl) acrylate (at a purity of 99%), the control compound A (methyl 3,4-dimethoxy cinnamate, at a purity of 99%), 96.5% of chlorothalonil technical (non-systemic broad-spectrum fungicide), 97.2% of carbendazim technical (systemic broad-spectrum fungicide), 97.0% of procymidone technical (systemic fungicide), 96.0% of dimethomorph ((E,Z)-4-[3-(4-chlorphenyl)3-(3,4-dimethoxy phenyl) acryloyl]morpholine, a systemic fungicide) technical, 97.0% of azoxystrobin technical (systemic broad-spectrum fungicide).

(2) Plant Pathogenic Fungi for Testing

*Rhizoctonia solani, Phytophthora infestans, Valsa mali, Phytophthora capsici, Fusarium graminearum, Mycosphaerlla melonis, Pythium aphanidermatum, Colletotrichum capsici, Botryosphaeriana berengeriana, Coniella diplodiella, F. oxysporum* f. sp. *vasinfectum, Gaeumannomyces graminis* var. *graminis* and *G. graminis* var. *tritici, Botryosphaeria berengeriana, C. gossypii, F. graminearum, Thanatephorus cucumeris, Botrytis cinerea, Exserohdum turcicum, F. verticillioide, Sclerotinia sclerotiorum, Pyricularia grisea, Phytophthora infestans* and *F. oxysporum* f. sp. *lini*, in total 23 kinds of plant pathogenic fungi.

(3) Ex Vivo Bioassay Method

The inhibition of samples for testing on the mycelial growth of plant pathogenic fungi for testing is determined with a growth rate method. Ethyl 3-(3'-fluoro-4'-methoxy phenyl) acrylate, ethyl 3-(3',4'-methylene dioxy phenyl) acrylate, ethyl 3-(3',4'-dimethoxy phenyl) acrylate as well as the control compound A and five control agents are dissolved with dimethyl sulfoxide (DMSO), then formulated at 5~7 concentrations of different gradients for test following the trial test results, with the same concentration of DMSO as the control solvent, each treatment in triplicate. Fungal cakes with a diameter of 4 mm are taken from the edge of the colony, inoculated into the center of a PDA plate containing different agents of different concentrations and the DMSO control, with one piece of fungal cake inoculated in each plate (with a diameter of 9 mm), and incubated in a constant temperature incubator at a temperature of 22±1.5° C. 7 days later (10~20 days may be needed for some pathogenic fungi), the diameter of the colony is measured with a cross over method according to the mycelial growth profile of the control pathogenic fungi, then the inhibition rate of mycelial growth is calculated. The computational formula is as below:

the inhibition rate of mycelial growth (%)=[(the diameter of the control colony−the diameter of the treated colony)/the diameter of the control colony]×100.

The determination results of the inhibition of each agent at a concentration of 1 mg/mL on the mycelial growth of plant pathogenic fungi are shown in Tables 1, 2, 3, 4, 5 and 6.

TABLE 1

| Name of Fungus Species | Average Diameter of the Colony (cm) | | | | | | |
|---|---|---|---|---|---|---|---|
| | Ethyl 3-(3'-fluoro-4'-methoxy phenyl) acrylate | Control Compound A | Chlorothalonil | Carbendazim | Procymidone | Azoxystrobin | Dimethomorph |
| *Rhizoctonia solani* | 0.00 | 0.67 | 0.00 | 0.00 | 0.00 | — | — |
| *Phytophthora infestans* | 1.40 | 2.77 | 1.78 | 0.00 | 0.80 | — | — |

TABLE 1-continued

| Name of Fungus Species | Ethyl 3-(3'-fluoro-4'-methoxy phenyl) acrylate | Control Compound A | Chlorothalonil | Carbendazim | Procymidone | Azoxystrobin | Dimethomorph |
|---|---|---|---|---|---|---|---|
| *Valsa mali* | 0.85 | 0.00 | 1.65 | — | 0.83 | — | — |
| *Phytophthora capsici* | 1.26 | 1.97 | 0.91 | 0.00 | 5.10 | 6.70 | 0.00 |
| *Fusarium graminearum* | 3.26 | — | 0.71 | 0.00 | 2.26 | — | — |
| *Mycosphaerlla melonis* | 0.37 | 0.67 | 2.16 | 0.00 | 0.24 | 3.93 | 2.13 |
| *Pythium aphanidermatum* | 2.60 | — | 1.14 | 0.00 | 6.20 | — | — |
| *Colletotrichum capsici* | 0.11 | — | 1.95 | 0.00 | 1.19 | — | — |
| *Botryosphaeriana berengeriana* | 1.19 | — | 0.94 | — | 0.20 | — | — |
| *Conidia diplodiella* | 0.00 | — | 0.00 | 0.00 | 0.06 | — | — |
| *F. oxysporum* f. sp. *vasinfectum* | 4.45 | 2.43 | 2.45 | 0.00 | 2.57 | 3.03 | 6.03 |
| *Gaeumannomyces graminis* var. *graminis* and *G. graminis* var. *tritici* | 2.29 | | 2.51 | — | 2.16 | — | — |
| *Botryosphaeria berengeriana* | 1.72 | | 2.11 | — | 0.15 | — | — |
| *C. gossypii* | 0.42 | 3.83 | 1.45 | 0.00 | 1.62 | 5.37 | 3.93 |
| *F. graminearum* | 2.77 | 4.90 | 1.92 | 1.17 | 3.57 | 6.23 | 6.23 |
| *Thanatephorus cucumeris* | 2.05 | — | 1.05 | 0.00 | 0.54 | — | — |
| *Botrytis cinerea* | 1.35 | 2.27 | 1.16 | 0.00 | 1.74 | 4.33 | 2.33 |
| *Exserohilum turcicum* | 0.10 | 1.37 | 1.41 | 9.00 | 0.24 | 6.50 | 6.50 |
| *F. verticillioide* | 2.34 | — | 0.87 | 0.00 | 2.57 | — | — |
| *Sclerotinia sclerotiorum* | 2.58 | 0.00 | 0.00 | 0.00 | 0.00 | 4.40 | 4.77 |
| *Pyricularia grisea* | 7.70 | 3.83 | 1.63 | 0.00 | 4.63 | 4.67 | 6.67 |
| *Phytophthora infestans* | 0.00 | 0.27 | 0.20 | 6.80 | 0.00 | 0.00 | 0.00 |
| *F. oxysporum* f. sp. *lini* | 7.20 | — | 3.73 | 0.00 | 6.33 | 5.93 | 6.27 |

(Note: "—" indicates not determined.)

TABLE 2

| Name of Fungus Species | Ethyl 3-(3',4'-methylene dioxy phenyl) acrylate | Control Compound A | Chlorothalonil | Carbendazim | Procymidone | Azoxystrobin | Dimethomorph |
|---|---|---|---|---|---|---|---|
| *Rhizoctonia solani* | 0.80 | 0.67 | 0.00 | 0.00 | 0.00 | — | — |
| *Phytophthora infestans* | 2.01 | 2.77 | 1.78 | 0.00 | 0.80 | — | — |
| *Valsa mali* | 0.00 | 0.00 | 1.65 | — | 0.83 | — | — |
| *Phytophthora capsici* | 1.42 | 1.97 | 0.91 | 0.00 | 5.10 | 6.70 | 0.00 |
| *Fusarium graminearum* | 3.00 | — | 0.71 | 0.00 | 2.26 | — | — |
| *Mycosphaerlla melonis* | 0.75 | 0.67 | 2.16 | 0.00 | 0.24 | 3.93 | 2.13 |
| *Pythium aphanidermatum* | 2.60 | — | 1.14 | 0.00 | 6.20 | — | — |
| *Colletotrichum capsici* | 1.49 | — | 1.95 | 0.00 | 1.19 | — | — |
| *Botryosphaeriana berengeriana* | 4.20 | — | 0.94 | — | 0.20 | — | — |

TABLE 2-continued

Average Diameter of the Colony (cm)

| Name of Fungus Species | Ethyl 3-(3',4'-methylene dioxy phenyl) acrylate | Control Compound A | Chlorothalonil | Carbendazim | Procymidone | Azoxystrobin | Dimethomorph |
|---|---|---|---|---|---|---|---|
| Conidia diplodiella | 0.00 | — | 0.00 | 0.00 | 0.06 | — | — |
| F. oxysporum f. sp. vasinfectum | 2.58 | 2.43 | 2.45 | 0.00 | 2.57 | 3.03 | 6.03 |
| Gaeumannomyces graminis var. graminis and G. graminis var. tritici | 2.45 | — | 2.51 | — | 2.16 | — | — |
| Botryosphaeria berengeriana | 3.45 | — | 2.11 | — | 0.15 | — | — |
| C. gossypii | 1.74 | 3.83 | 1.45 | 0.00 | 1.62 | 5.37 | 3.93 |
| F. graminearum | 1.73 | 4.90 | 1.92 | 1.17 | 3.57 | 6.23 | 6.23 |
| Thanatephorus cucumeris | 3.75 | — | 1.05 | 0.00 | 0.54 | — | — |
| Botrytis cinerea | 2.17 | 2.27 | 1.16 | 0.00 | 1.74 | 4.33 | 2.33 |
| Exserohilum turcicum | 1.52 | 1.37 | 1.41 | 9.00 | 0.24 | 6.50 | 6.50 |
| F. verticillioide | 2.91 | — | 0.87 | 0.00 | 2.57 | — | — |
| Sclerotinia sclerotiorum | 4.71 | 0.00 | 0.00 | 0.00 | 0.00 | 4.40 | 4.77 |
| Pyricularia grisea | 2.70 | 3.83 | 1.63 | 0.00 | 4.63 | 4.67 | 6.67 |
| Phytophthora infestans | 0.00 | 0.27 | 0.20 | 6.80 | 0.00 | 0.00 | 0.00 |
| F. oxysporum f. sp. lini | 6.97 | — | 3.73 | 0.00 | 6.33 | 5.93 | 6.27 |

TABLE 3

Average Diameter of the Colony (cm)

| Name of Fungus Species | Ethyl 3-(3',4'-dimethoxy phenyl) acrylate | Control Compound A | Chlorothalonil | Carbendazim | Procymidone | Azoxystrobin | Dimethomorph |
|---|---|---|---|---|---|---|---|
| Rhizoctonia solani | 0.00 | 0.67 | 0.00 | 0.00 | 0.00 | — | — |
| Phytophthora infestans | 1.33 | 2.77 | 1.78 | 0.00 | 0.80 | — | — |
| Valsa mali | 0.00 | 0.00 | 1.65 | — | 0.83 | — | — |
| Phytophthora capsici | 0.75 | 1.97 | 0.91 | 0.00 | 5.10 | 6.70 | 0.00 |
| Fusarium graminearum | 1.40 | — | 0.71 | 0.00 | 2.26 | — | — |
| Mycosphaerlla melonis | 0.05 | 0.67 | 2.16 | 0.00 | 0.24 | 3.93 | 2.13 |
| Pythium aphanidermatum | 0.73 | — | 1.14 | 0.00 | 6.20 | — | — |
| Colletotrichum capsici | 0.83 | — | 1.95 | 0.00 | 1.19 | — | — |
| Botryosphaeriana berengeriana | 1.58 | — | 0.94 | — | 0.20 | — | — |
| Coniella diplodiella | 0.00 | — | 0.00 | 0.00 | 0.06 | — | — |
| F. oxysporum f. sp. vasinfectum | 2.68 | 2.43 | 2.45 | 0.00 | 2.57 | 3.03 | 6.03 |
| Gaeumannomyces graminis var. graminis and G. graminis var. tritici | 2.56 | — | 2.51 | — | 2.16 | — | — |
| Botryosphaeria berengeriana | 2.95 | — | 2.11 | — | 0.15 | — | — |
| C. gossypii | 1.33 | 3.83 | 1.45 | 0.00 | 1.62 | 5.37 | 3.93 |
| F. graminearum | 2.74 | 4.90 | 1.92 | 1.17 | 3.57 | 6.23 | 6.23 |
| Thanatephorus cucumeris | 0.94 | — | 1.05 | 0.00 | 0.54 | — | — |
| Botrytis cinerea | 0.61 | 2.27 | 1.16 | 0.00 | 1.74 | 4.33 | 2.33 |

TABLE 3-continued

Average Diameter of the Colony (cm)

| Name of Fungus Species | Ethyl 3-(3',4'-dimethoxy phenyl) acrylate | Control Compound A | Chlorothalonil | Carbendazim | Procymidone | Azoxystrobin | Dimethomorph |
|---|---|---|---|---|---|---|---|
| *Exserohilum turcicum* | 0.56 | 1.37 | 1.41 | 9.00 | 0.24 | 6.50 | 6.50 |
| *F. verticillioide* | 2.28 | — | 0.87 | 0.00 | 2.57 | — | — |
| *Sclerotinia sclerotiorum* | 1.34 | 0.00 | 0.00 | 0.00 | 0.00 | 4.40 | 4.77 |
| *Pyricularia grisea* | 5.47 | 3.83 | 1.63 | 0.00 | 4.63 | 4.67 | 6.67 |
| *Phytophthora infestans* | 0.00 | 0.27 | 0.20 | 6.80 | 0.00 | 0.00 | 0.00 |
| *F. oxysporum* f. sp. *lini* | 6.17 | — | 3.73 | 0.00 | 6.33 | 5.93 | 6.27 |

TABLE 4

Inhibition Rate (%)

| Name of Fungus Species | Ethyl 3-(3'-fluoro-4'-methoxy phenyl) acrylate | Control Compound A | Chlorothalonil | Carbendazim | Procymidone | Azoxystrobin | Dimethomorph |
|---|---|---|---|---|---|---|---|
| *Rhizoctonia solani* | 100 | 91.52 | 100 | 100 | 100 | — | — |
| *Phytophthora infestans* | 60.56 | 64.94 | 49.86 | 100 | 77.47 | — | — |
| *Valsa mali* | 89.24 | 100 | 79.11 | — | 89.02 | — | — |
| *Phytophthora capsici* | 76.23 | 75.06 | 82.83 | 100 | 3.77 | 25.55 | 100 |
| *Fusarium graminearum* | 39.07 | — | 86.73 | 100 | 57.7 | — | — |
| *Mycosphaerlla melonis* | 95.70 | 91.52 | 74.88 | 100 | 97.21 | 56.33 | 76.33 |
| *Pythium aphanidermatum* | 61.19 | — | 82.99 | 100 | 7.46 | — | — |
| *Colletotrichum capsici* | 98.38 | — | 71.24 | 100 | 82.45 | — | — |
| *Botryosphaeriana berengeriana* | 79.12 | — | 83.51 | — | 96.49 | — | — |
| *Conidia diplodiella* | 100 | — | 100 | 100 | 99.14 | — | — |
| *F. oxysporum* f. sp. *vasinfectum* | 38.54 | 69.24 | 66.16 | 100 | 64.50 | 66.33 | 33.0 |
| *Gaeumannomyces graminis* var. *graminis* and *G. graminis* var. *tritici* | 40.0 | — | 64.90 | — | 69.79 | — | — |
| *Botryosphaeria berengeriana* | 74.71 | — | 68.97 | — | 97.79 | — | — |
| *C. gossypii* | 92.22 | 51.52 | 73.15 | 100 | 70.0 | 40.33 | 56.33 |
| *F. graminearum* | 67.79 | 37.98 | 77.67 | 87 | 58.49 | 30.78 | 30.78 |
| *Thanatephorus cucumeris* | 76.16 | — | 87.79 | 100 | 93.72 | — | — |
| *Botrytis cinerea* | 81.98 | 71.27 | 84.51 | 100 | 76.77 | 51.89 | 74.11 |
| *Exserohilum turcicum* | 98.39 | 82.66 | 77.30 | 0 | 96.14 | 27.78 | 27.78 |
| *F. verticillioide* | 30.77 | — | 74.26 | 100 | 23.96 | — | — |
| *Sclerotinia sclerotiorum* | 70.0 | 100 | 100 | 100 | 100 | 51.11 | 47.0 |
| *Pyricularia grisea* | 14.44 | 51.52 | 81.89 | 100 | 48.56 | 48.11 | 25.89 |
| *Phytophthora infestans* | 100 | 96.58 | 97.78 | 24.44 | 100 | 100 | 100 |
| *F. oxysporum* f. sp. *lini* | 20.0 | — | 58.56 | 100 | 29.67 | 34.11 | 30.33 |

TABLE 5

| Name of Fungus Species | Inhibition Rate (%) | | | | | | |
|---|---|---|---|---|---|---|---|
| | Ethyl 3-(3',4'-methylene dioxy phenyl) acrylate | Control Compound A | Chlorothalonil | Carbendazim | Procymidone | Azoxystrobin | Dimethomorph |
| Rhizoctonia solani | 88.76 | 91.52 | 100 | 100 | 100 | — | — |
| Phytophthora infestans | 43.38 | 64.94 | 49.86 | 100 | 77.47 | — | — |
| Valsa mali | 100 | 100 | 79.11 | — | 89.02 | — | — |
| Phytophthora capsici | 73.21 | 75.06 | 82.83 | 100 | 3.77 | 25.55 | 100 |
| Fusarium graminearum | 43.93 | — | 86.73 | 100 | 57.7 | — | — |
| Mycosphaerlla melonis | 91.28 | 91.52 | 74.88 | 100 | 97.21 | 56.33 | 76.33 |
| Pythium aphanidermatum | 61.19 | — | 82.99 | 100 | 7.46 | — | — |
| Colletotrichum capsici | 78.02 | — | 71.24 | 100 | 82.45 | — | — |
| Botryosphaeriana berengeriana | 26.32 | — | 83.51 | — | 96.49 | — | — |
| Conidia diplodiella | 100 | — | 100 | 100 | 99.14 | — | — |
| F. oxysporum f. sp. vasinfectum | 64.37 | 69.24 | 66.16 | 100 | 64.50 | 66.33 | 33.0 |
| Gaeumannomyces graminis var. graminis and G. graminis var. tritici | 65.73 | — | 64.90 | — | 69.79 | — | — |
| Botryosphaeria berengeriana | 49.27 | — | 68.97 | — | 97.79 | — | — |
| C. gossypii | 67.78 | 51.52 | 73.15 | 100 | 70.0 | 40.33 | 56.33 |
| F. graminearum | 79.88 | 37.98 | 77.67 | 87.0 | 58.49 | 30.78 | 30.78 |
| Thanatephorus cucumeris | 56.40 | — | 87.79 | 100 | 93.72 | — | — |
| Botrytis cinerea | 71.03 | 71.27 | 84.51 | 100 | 76.77 | 51.89 | 74.11 |
| Exserohilum turcicum | 75.52 | 82.66 | 77.30 | 0.0 | 96.14 | 27.78 | 27.78 |
| F. verticillioide | 13.91 | — | 74.26 | 100 | 23.96 | — | — |
| Sclerotinia sclerotiorum | 45.23 | 100 | 100 | 100 | 100 | 51.11 | 47.0 |
| Pyricularia grisea | 25.56 | 51.52 | 81.89 | 100 | 48.56 | 48.11 | 25.89 |
| Phytophthora infestans | 100 | 96.58 | 97.78 | 24.44 | 100 | 100 | 100 |
| F. oxysporum f. sp. lini | 22.56 | — | 58.56 | 100 | 29.67 | 34.11 | 30.33 |

TABLE 6

| Name of Fungus Species | Inhibition Rate (%) | | | | | | |
|---|---|---|---|---|---|---|---|
| | Ethyl 3-(3',4'-dimethoxy phenyl) acrylate | Control Compound A | Chlorothalonil | Carbendazim | Procymidone | Azoxystrobin | Dimethomorph |
| Rhizoctonia solani | 100 | 91.52 | 100 | 100 | 100 | — | — |
| Phytophthora infestans | 62.54 | 64.94 | 49.86 | 100 | 77.47 | — | — |
| Valsa mali | 100 | 100 | 79.11 | — | 89.02 | — | — |
| Phytophthora capsici | 85.85 | 75.06 | 82.83 | 100 | 3.77 | 25.55 | 100 |
| Fusarium graminearum | 73.83 | — | 86.73 | 100 | 57.7 | — | — |
| Mycosphaerlla melonis | 99.42 | 91.52 | 74.88 | 100 | 97.21 | 56.33 | 76.33 |
| Pythium aphanidermatum | 89.10 | — | 82.99 | 100 | 7.46 | — | — |
| Colletotrichum capsici | 87.76 | — | 71.24 | 100 | 82.45 | — | — |

TABLE 6-continued

| Name of Fungus Species | Ethyl 3-(3',4'-dimethoxy phenyl) acrylate | Control Compound A | Chlorothalonil | Carbendazim | Procymidone | Azoxystrobin | Dimethomorph |
|---|---|---|---|---|---|---|---|
| Botryosphaeriana berengeriana | 72.28 | — | 83.51 | — | 96.49 | — | — |
| Coniella diplodiella | 100 | — | 100 | 100 | 99.14 | — | — |
| F. oxysporum f. sp. vasinfectum | 62.98 | 69.24 | 66.16 | 100 | 64.50 | 66.33 | 33.0 |
| Gaeumannomyces graminis var. graminis and G. graminis var. tritici | 64.20 | — | 64.90 | — | 69.79 | — | — |
| Botryosphaeria berengeriana | 56.62 | — | 68.97 | — | 97.79 | — | — |
| C. gossypii | 75.37 | 51.52 | 73.15 | 100 | 70.00 | 40.33 | 56.33 |
| F. graminearum | 68.14 | 37.98 | 77.67 | 87.0 | 58.49 | 30.78 | 30.78 |
| Thanatephorus cucumeris | 89.07 | — | 87.79 | 100 | 93.72 | — | — |
| Botrytis cinerea | 91.86 | 71.27 | 84.51 | 100 | 76.77 | 51.89 | 74.11 |
| Exserohilum turcicum | 90.98 | 82.66 | 77.30 | 0.0 | 96.14 | 27.78 | 27.78 |
| F. verticillioide | 32.54 | — | 74.26 | 100 | 23.96 | — | — |
| Sclerotinia sclerotiorum | 84.42 | 100 | 100 | 100 | 100 | 51.11 | 47.0 |
| Pyricularia grisea | 39.22 | 51.52 | 81.89 | 100 | 48.56 | 48.11 | 25.89 |
| Phytophthora infestans | 100 | 96.58 | 97.78 | 24.44 | 100 | 100 | 100 |
| F. oxysporum f. sp. lini | 31.44 | — | 58.56 | 100 | 29.67 | 34.11 | 30.33 |

It is indicated from the determination results of antifungal activities (Table 1, 4) that: ethyl 3-(3'-fluoro-4'-methoxy phenyl) acrylate has strong inhibition on the mycelial growth of the following 9 plant pathogenic fungi: *Rhizoctonia solani, Valsa mali, Mycosphaerlla melonis, Colletotrichum capsici, Coniella diplodiella, C. gossypii, Botrytis cinerea, Exserohilum turcicum* and *Phytophthora infestans*, with the inhibition rate at the concentration of 1 mg/mL between 81.98% and 100%. Wherein, its antifungal activities on *Valsa mali, Mycosphaerlla melonis, Colletotrichum capsici, Coniella diplodiella, C. gossypii* and *Exserohilum turcicum* are superior to that of chlorothalonil; its antifungal activities on *Rhizoctonia solani, Botrytis cinerea* and *Phytophthora infestans* are comparable to that of chlorothalonil; its antifungal activities on *Exserohilum turcicum* and *Phytophthora infestans* are superior to that of the control agent, carbendazim; its antifungal activities on *Rhizoctonia solani, Mycosphaerlla melonis, Colletotrichum capsici, Coniella diplodiella* and *C. gossypii* are comparable to that of carbendazim; its antifungal activities on *Colletotrichum capsici* and *C. gossypii* are superior to that of the control agent, procymidone; its antifungal activities on *Rhizoctonia solani, Valsa mali, Mycosphaerlla melonis, Coniella diplodiella Botrytis cinerea, Exserohilum turcicum* and *Phytophthora infestans* are comparable to that of procymidone; its antifungal activities on *Mycosphaerlla melonis, C. gossypii, Botrytis cinerea* and *Exserohilum turcicum* are significantly superior to that of the control agent, Azoxystrobin; its antifungal activity on *Phytophthora infestans* is comparable to that of Azoxystrobin; its antifungal activities on *Mycosphaerlla melonis, C. gossypii* and *Exserohilum turcicum* are significantly superior to that of the control agent, dimethomorph; its antifungal activity on *Botrytis cinerea* is superior to that of dimethomorph; its antifungal activity on *Phytophthora infestans* is comparable to that of dimethomorph. The supplementary determination results further show that, the antifungal activity of ethyl 3-(3'-fluoro-4'-methoxy phenyl) acrylate on *Phytophthora capsici* is superior to that of the control agent, hymexazol (3-hydroxy-5-methyl isoxazole, systemic broad-spectrum fungicide).

It is indicated from the determination results of antifungal activities (Table 2, 5) that, ethyl 3-(3',4'-methylene dioxy phenyl) acrylate has strong inhibition on the mycelial growth of the following 5 plant pathogenic fungi: *Rhizoctonia solani, Valsa mali, Mycosphaerlla melonis, Coniella diplodiella* and *Phytophthora infestans*, with the inhibition rate at the concentration of 1 mg/mL between 88.76% and 100%. Wherein, its antifungal activities on *Coniella diplodiella* and *Mycosphaerlla melonis* are superior to that of the control agent, chlorothalonil; its antifungal activities on *Rhizoctonia solani, Coniella diplodiella* and *Phytophthora infestans* are comparable to that of the control agent, chlorothalonil. Its antifungal activity on *Phytophthora infestans* is significantly superior to that of the control agent, carbendazim; its antifungal activities on *Mycosphaerlla melonis* and *Coniella diplodiella* are comparable to that of carbendazim. Its antifungal activity on *Valsa mali* is superior to that of the control agent, procymidone; its antifungal activities on *Mycosphaerlla melonis, Coniella diplodiella* and *Phytophthora infestans* are comparable to that of procymidone. Its antifungal activity on *Mycosphaerlla melonis* is significantly superior to that of the control agent, Azoxystrobin; its antifungal activity on *Phytophthora infestans* is comparable to that of Azoxystrobin. Its antifungal activity on *Mycosphaerlla melonis* is significantly superior to that of the control agent, dimethomorph; its antifungal activity on *Phytophthora infestans* is comparable to that of dimethomorph. The supplementary determination results further show that, the antifungal activity of ethyl 3-(3',4'-methylene dioxy phenyl) acrylate on *Phytophthora capsici* is superior to that of the control agent, hymexazol (3-hydroxy-5-methyl isoxazole, systemic broad-spectrum fungicide).

It is indicated from the determination results of antifungal activities (Table 3, 6) that, ethyl 3-(3',4'-dimethoxy phenyl) acrylate has strong inhibition on the mycelial growth of the following 12 plant pathogenic fungi: *Rhizoctonia solani, Valsa mali, Phytophthora capsici, Mycosphaerlla melonis, Pythium aphanidermatum, Colletotrichum capsici, Coniella diplodiella Thanatephorus cucumeris, Botrytis cinerea, Exserohilum turcicum, Sclerotinia sclerotiorum* and *Phytophthora infestans*, with the inhibition rate at the concentration of 1 mg/mL between 84.42% and 100%. Wherein, its antifungal activities on *Valsa mali, Mycosphaerlla melonis, Colletotrichum capsici, Botrytis cinerea* and *Exserohilum turcicum* are superior to that of the control agent, chlorothalonil; its antifungal activities on *Rhizoctonia solani, Phytophthora capsici, Pythium aphanidermatum, Coniella diplodiella Thanatephorus cucumeris* and *Phytophthora infestans* are comparable to that of chlorothalonil. Its antifungal activities on *Exserohilum turcicum* and *Phytophthora infestans* are significantly superior to that of the control agent, carbendazim; its antifungal activities on *Rhizoctonia solani, Mycosphaerlla melonis, Coniella diplodiella* and *Botrytis cinerea* are comparable to that of carbendazim. Its antifungal activities on *Phytophthora capsici* and *Pythium aphanidermatum* are significantly superior to that of the control agent, procymidone; its antifungal activities on *Valsa mali* and *Botrytis cinerea* are superior to that of procymidone; its antifungal activities on *Rhizoctonia solani, Mycosphaerlla melonis, Colletotrichum capsici, Coniella diplodiella Thanatephorus cucumeris, Exserohilum turcicum* and *Phytophthora infestans* are comparable to that of procymidone. Its antifungal activities on *Phytophthora capsici, Mycosphaerlla melonis, Botrytis cinerea, Exserohilum turcicum* and *Sclerotinia sclerotiorum* are significantly superior to that of the control agent, Azoxystrobin; its antifungal activity on *Phytophthora infestans* is comparable to that of Azoxystrobin. Its antifungal activities on *Exserohilum turcicum* and *Sclerotinia sclerotiorum* are significantly superior to that of the control agent, dimethomorph; its antifungal activities on *Mycosphaerlla melonis* and *Botrytis cinerea* are superior to that of dimethomorph; its antifungal activity on *Phytophthora infestans* is comparable to that of dimethomorph. The supplementary determination results further show that, the antifungal activity of ethyl 3-(3',4'-dimethoxy phenyl) acrylate on *Phytophthora capsici* is superior to that of the control agent, hymexazol, and its antifungal activity on *Pythium ultimum* is superior to that of the control agent, carbendazim.

It can be seen from the comparison of antifungal activities with the control compound A (Table 1, 4) that, the antifungal activities of ethyl 3-(3'-fluoro-4'-methoxy phenyl) acrylate on the following 5 plant pathogenic fungi: *Rhizoctonia solani, C. gossypii, F. graminearum, Botrytis cinerea* and *Exserohilum turcicum*, are superior to that of the control compound A; its antifungal activities on the following 4 plant pathogenic fungi: *Phytophthora infestans, Phytophthora capsici, Mycosphaerlla melonis* and *Phytophthora infestans*, are comparable to that of the control compound A; its antifungal activities on the following 4 plant pathogenic fungi: *Valsa mali, F. oxysporum* f sp. *vasinfectum, Sclerotinia sclerotiorum* and *Pyricularia grisea*, are inferior to that of the control compound A. It is collectively evaluated that, the antifungal activities of ethyl 3-(3'-fluoro-4'-methoxy phenyl) acrylate on the following 9 plant pathogenic fungi: *Rhizoctonia solani, C. gossypii, F graminearum, Botrytis cinerea, Exserohilum turcicum, Phytophthora infestans, Phytophthora capsici, Mycosphaerlla melonis* and *Phytophthora infestans* are superior to or comparable to that of the control compound A.

It can be seen from the comparison of antifungal activities with the control compound A (Table 2, 5) that, the antifungal activities of ethyl 3-(3',4'-methylene dioxy phenyl) acrylate on the following 2 plant pathogenic fungi: *C. gossypii* and *F. graminearum*, are superior to that of the control compound A; its antifungal activities on the following 7 plant pathogenic fungi: *Rhizoctonia solani, Valsa mali, Phytophthora capsici, Mycosphaerlla melonis, F. oxysporum* f. sp. *vasinfectum, Botrytis cinerea* and *Phytophthora infestans* are comparable to that of the control compound A; its antifungal activities on the following 4 plant pathogenic fungi: *Phytophthora infestans, Exserohilum turcicum, Sclerotinia sclerotiorum* and *Pyricularia grisea* are inferior to that of the control compound A. It is collectively evaluated that, the antifungal activities of ethyl 3-(3',4'-methylene dioxy phenyl) acrylate on the following 9 plant pathogenic fungi: *C. gossypii, F graminearum, Rhizoctonia solani, Valsa mali, Phytophthora capsici, Mycosphaerlla melonis, F oxysporum* f. sp. *vasinfectum, Botrytis cinerea* and *Phytophthora infestans* are superior to or comparable to that of the control compound A.

It can be seen from the comparison of antifungal activities with the control compound A (Table 3, 6) that, the antifungal activities of a ethyl 3-(3',4'-dimethoxy phenyl) acrylate on the following 7 plant pathogenic fungi: *Rhizoctonia solani, Phytophthora capsici, Mycosphaerlla melonis, C. gossypii, F graminearum, Botrytis cinerea* and *Exserohilum turcicum*, are superior to that of the control compound A; its antifungal activities on the following 3 plant pathogenic fungi: *Phytophthora infestans, Valsa mali* and *Phytophthora infestans*, are comparable to that of the control compound A; its antifungal activities on the following 3 plant pathogenic fungi: *F. oxysporum* f sp. *vasinfectum, Sclerotinia sclerotiorum* and *Pyricularia grisea*, are inferior to that of the control compound A. It is collectively evaluated that, the antifungal activities of ethyl 3-(3',4'-dimethoxy phenyl) acrylate on the following 10 plant pathogenic fungi: *Rhizoctonia solani, Phytophthora capsici, Mycosphaerlla melonis, C. gossypii, F graminearum, Botrytis cinerea, Exserohilum turcicum, Phytophthora infestans, Valsa mali* and *Phytophthora infestans*, are superior to or are comparable to that of the control compound A.

Embodiment 2: Determination of Allied Toxicity Function of the Combined ethyl 3-(3',4'-methylene dioxy phenyl) acrylate and 3-(3',4'-dimethoxy phenyl) ethyl acrylate as Well as Metalaxyl and Hymexazol on *Phytophthora capsici*

(1) Agents for Testing

Ethyl 3-(3',4'-methylene dioxy phenyl) acrylate, ethyl 3-(3',4'-dimethoxy phenyl) acrylate, 98% of metalaxyl technical, and 99% of hymexazol technical.

(2) Plant Pathogenic Fungi for Testing

*P. capsici.*

(3) Determination of Toxicity

Ethyl 3-(3',4'-methylene dioxy phenyl) acrylate and ethyl 3-(3',4'-dimethoxy phenyl) acrylate (A) as well as metalaxyl and hymexazol (B) were all mixed in the following five mass ratios of 3:1, 2:1, 1:1, 1:2, or 1:3, and formulated into the corresponding 6 to 8 concentration gradients for each mass ratio. The allied toxicity of *Phytophthora capsici* was determined with a growth rate method, with the specific determination method seen in Embodiment 1. The diameter of the colony was measured, and the inhibition rate of the mixture on the mycelial growth was calculated. The concentration of the active ingredients of the mixture in the culture medium was used as the testing concentration to calculate the toxic regression equation (Y=bx+a) and the median inhibition concentration $EC_{50}$, and further calculate the actual toxicity index (ATI) and the theoretical toxicity index (TTI), thus calculating the co-toxicity coefficient (CTC) at different mass ratios. The computational formula is as below:

Actual toxicity index of the mixture (ATI)=($EC_{50}$ of standard agent/$EC_{50}$ of the mixture)×100;

Theoretical toxicity index of the mixture (TTI)=Toxicity index of agent A×Percentage of agent A in the mixed formulation+Toxicity index of agent B×Percentage of agent B in the mixed formulation;

Co-toxicity coefficient (CTC)=[Actual toxicity index of the mixture (ATI)/Theoretical toxicity index of the mixture (TTI)]×100.

According to the co-toxicity coefficient, the allied function is comprehensively evaluated: CTC <80, antagonism; CTC >120, synergism; 80<CTC <120, additive effect.

(4) Determination Results of Toxicity

TABLE 7

| Mixed Formulation | Mass Ratio | $EC_{50}$ (µg/mL) | CTC | Allied Function |
| --- | --- | --- | --- | --- |
| Ethyl 3-(3',4'-methylene dioxy phenyl) acrylate + Metalaxyl | 3:1 | 73.05 | 377.3 | Synergism |
| | 2:1 | 53.16 | 497.4 | Synergism |
| | 1:1 | 70.51 | 346.1 | Synergism |
| | 1:2 | 65.17 | 348.0 | Synergism |
| | 1:3 | 106.30 | 206.3 | Synergism |
| Ethyl 3-(3',4'-methylene dioxy phenyl) acrylate + Hymexazol | 3:1 | 191.63 | 188.5 | Synergism |
| | 2:1 | 235.31 | 161.2 | Synergism |
| | 1:1 | 301.78 | 140.5 | Synergism |
| | 1:2 | 329.31 | 145.3 | Synergism |
| | 1:3 | 372.27 | 137.6 | Synergism |
| Ethyl 3-(3',4'-dimethoxy phenyl) acrylate + Metalaxyl | 3:1 | 143.11 | 79.4 | Antagonism |
| | 2:1 | 181.44 | 66.1 | Antagonism |
| | 1:1 | 222.16 | 60.5 | Antagonism |
| | 1:2 | 244.72 | 61.4 | Antagonism |
| | 1:3 | 282.55 | 56.2 | Antagonism |
| Ethyl 3-(3',4'-dimethoxy phenyl) acrylate + Hymexazol | 3:1 | 287.94 | 44.2 | Antagonism |
| | 2:1 | 335.50 | 41.8 | Antagonism |
| | 1:1 | 377.49 | 46.5 | Antagonism |
| | 1:2 | 474.99 | 48.3 | Antagonism |
| | 1:3 | 645.91 | 42.1 | Antagonism |

It is indicated from the determination results (Table 7) that, the mixture of ethyl 3-(3',4'-methylene dioxy phenyl) acrylate and metalaxyl has a very significant synergistic effect on *Phytophthora capsici*, with a co-toxicity coefficient between 206.3 and 497.4, wherein the mixture at a mass ratio of 2:1 has the most significant synergistic effect, the co-toxicity coefficient is 497.4, $EC_{50}$ is 53.16 µg/mL, and the relative toxicity is 5.94 or 3.75 times that of a single agent, ethyl 3-(3',4'-methylene dioxy phenyl) acrylate or metalaxyl, respectively; while the mixture of ethyl 3-(3',4'-methylene dioxy phenyl) acrylate and hymexazol shows a certain degree of synergistic effect, with a co-toxicity coefficient between 137.6 and 188.5.

The mixture of ethyl 3-(3',4'-dimethoxy phenyl) acrylate, metalaxyl and hymexazol shows an antagonistic effect on *Phytophthora capsici*, with a co-toxicity coefficient between 41.8% and 79.4%.

Embodiment 3: In-Vivo Determination of ethyl 3-(3'-fluoro-4'-methoxy phenyl) acrylate, ethyl 3-(3', 4'-methylene dioxy phenyl) acrylate, ethyl 3-(3',4'-dimethoxy phenyl) acrylate and the Control Compound A on the Control of Zucchini Powdery Mildew in a Greenhouse (1) Formulation of Emulsifiable Concentrate 4.59 g of ethyl 3-(3'-fluoro-4'-methoxy phenyl) acrylate was weighed, dissolved in 25 mL xylene, then 6 g of emulsifier 0203B was added, and mixed uniformly with stirring to get 14% of ethyl 3-(3'-fluoro-4'-methoxy phenyl) acrylate EC. 4.59 g of ethyl 3-(3',4'-methylene dioxy phenyl) acrylate was weighed, dissolved in 25 mL xylene, then 6 g of emulsifier 0203B was added, and mixed uniformly with stirring to get 14% of ethyl 3-(3',4'-methylene dioxy phenyl) acrylate EC. 3.16 g of ethyl 3-(3',4'-dimethoxy phenyl) acrylate was weighed, dissolved in 25 mL xylene, then 6 g of emulsifier 0203B was added, and mixed uniformly with stirring to get 10% of ethyl 3-(3',4'-dimethoxy phenyl) acrylate EC. 4.59 g of the control compound A was weighed, dissolved in 25 mL xylene, then 6 g of emulsifier 0203B was added, and mixed uniformly with stirring to get 14% of the control compound EC.

(2) In-Vivo Determination Method

Zucchini (Variety: Wuwei Xianglin extra-early $1^{st}$ generation) were cultured in pots in a greenhouse, and inoculated with *Erysiphe cucurbitacearum* or *Sphaerotheca cucurbitae* at the stage of 3 to 4 leaves. The first application was started at the early onset (onset at the first true leaf: first appearance of spots), comprising 14% of ethyl 3-(3'-fluoro-4'-methoxy phenyl) acrylate EC, 14% of ethyl 3-(3',4'-methylene dioxy phenyl) acrylate EC, 10% of ethyl 3-(3',4'-dimethoxy phenyl) acrylate EC and 14% of the control compound A EC, which were all diluted at the concentrations of 0.50, 0.333, 0.25, 0.20 mg/mL (active ingredients), additionally clear water was used as the control. Both sides of the leaves were sprayed evenly with a small hand-held sprayer so that the leaves were wetted by the liquor without loss. Applications were conducted every 7 days consecutively for 4 times. 10 days after the fourth application, the number of disease leaves at each grade of powdery mildew was investigated for the whole plant following the grading standard of 9 grades, to calculate the disease index and the control effect. The computational formula is as below:

Disease index=[(Number of disease leaves at each grade×Corresponding grade value)/(Total number of investigated leaves×9)]×100;

Control effect=(Disease index of the clear water control−Treated disease index)/Disease index of the clear water control×100.

(3) Determination Results

It is indicated from the determination results (Table 8) that, the applications of ethyl 3-(3'-fluoro-4'-methoxy phenyl) acrylate, ethyl 3-(3',4'-methylene dioxy phenyl) acrylate and ethyl 3-(3',4'-dimethoxy phenyl) acrylate at the early onset have good control effects on zucchini powdery mildew. The control effects at the concentration of 0.50 mg/mL are 97.11%, 97.93% and 98.63%, respectively; the control effects at the concentration of 0.333 mg/mL are 95.60%, 96.21% and 95.52%, respectively; the control effects are comparable. However, at a low concentration of 0.20 mg/mL, the control effects are 52.71%, 77.06% and 81.83%, respectively; the control effect of ethyl 3-(3',4'-dimethoxy phenyl) acrylate is superior to that of ethyl 3-(3',4'-methylene dioxy phenyl) acrylate, and the control effect of ethyl 3-(3',4'-methylene dioxy phenyl) acrylate is superior to that of ethyl 3-(3'-fluoro-4'-methoxy phenyl) acrylate. Compared with the control compound A, the control effects of ethyl 3-(3'-fluoro-4'-methoxy phenyl) acrylate, ethyl 3-(3',4'-methylene dioxy phenyl) acrylate and ethyl 3-(3',4'-dimethoxy phenyl) acrylate at higher concentrations (0.50, 0.333 mg/mL) are comparable to that of the control compound A; while at lower concentrations (0.25, 0.20 mg/mL), the control effect of ethyl 3-(3',4'-dimethoxy phenyl) acrylate is superior to that of the control compound A, the control effect of ethyl 3-(3',4'-methylene dioxy phenyl) acrylate is comparable to that of the control compound A, and the control effect of ethyl 3-(3'-fluoro-4'-methoxy phenyl) acrylate is inferior to that of the control compound A.

TABLE 8

| Name of Agents | Concentration of Agents (mg/mL) | Disease Index 10 days after the Fourth Application | Control Effect (%) |
| --- | --- | --- | --- |
| 14% of ethyl 3-(3'-fluoro-4'-methoxy phenyl) acrylate EC | 0.50 | 2.33 | 97.11 |
| | 0.333 | 3.55 | 95.60 |
| | 0.25 | 19.72 | 75.57 |
| | 0.20 | 38.18 | 52.71 |
| 14% of ethyl 3-(3',4'-methylene dioxy phenyl) acrylate EC | 0.50 | 1.67 | 97.93 |
| | 0.333 | 3.06 | 96.21 |
| | 0.25 | 15.64 | 80.63 |
| | 0.20 | 18.52 | 77.06 |
| 10% of ethyl 3-(3',4'-dimethoxy phenyl) acrylate EC | 0.50 | 1.11 | 98.63 |
| | 0.333 | 3.70 | 95.42 |
| | 0.25 | 9.80 | 87.86 |
| | 0.20 | 14.68 | 81.83 |
| 14% of the control compound A EC | 0.50 | 1.73 | 97.86 |
| | 0.333 | 3.50 | 95.66 |
| | 0.25 | 14.95 | 81.48 |
| | 0.20 | 20.60 | 74.48 |
| CK (clear water) | — | 80.73 | — |

Embodiment 4: In-Vivo Determination of ethyl 3-(3'-fluoro-4'-methoxy phenyl) acrylate, ethyl 3-(3',4'-methylene dioxy phenyl) acrylate and ethyl 3-(3',4'-dimethoxy phenyl) acrylate and the Control Compound A on the Control of Marrow Bean Powdery Mildew in a Greenhouse (1) Formulation of Emulsifiable Concentrate
The same as that in Embodiment 3.
(2) In-Vivo Determination Method
Marrow bean (Variety: Thailand Jiadouwang) were cultured in pots in a greenhouse, and inoculated with *E. polygoni* at the stage of 4 leaves. The first application was started at the early onset (onset at the first true leaf: first appearance of spots), comprising 14% of ethyl 3-(3'-fluoro-4'-methoxy phenyl) acrylate EC, 14% of ethyl 3-(3',4'-methylene dioxy phenyl) acrylate EC, 10% of ethyl 3-(3',4'-dimethoxy phenyl) acrylate EC and 14% of the control compound A EC, which were all diluted at the concentrations of 0.20, 0.143, 0.10 mg/mL (active ingredients), the control agent, 12.5% of myclobutanil EC (North China pharmaceutical Group, Ainuo Co. Ltd.), was also diluted at the concentrations of 0.20, 0.143, 0.10 mg/mL (active ingredients), additionally clear water was used as the control. Both sides of the leaves were sprayed evenly with a small hand-held sprayer so that the leaves were wetted by the liquor without loss. Applications were conducted every 7 days consecutively for 4 times. 10 days after the fourth application, the number of disease leaves at each grade of powdery mildew was investigated for the whole plant following the grading standard of 9 grades, to calculate the disease index and the control effect.

(3) Determination Results

It is indicated from the determination results (Table 9) that, the applications of ethyl 3-(3'-fluoro-4'-methoxy phenyl) acrylate, ethyl 3-(3',4'-methylene dioxy phenyl) acrylate and ethyl 3-(3',4'-dimethoxy phenyl) acrylate at the early onset have good control effects on marrow bean powdery mildew. The control effect of ethyl 3-(3',4'-dimethoxy phenyl) acrylate is superior to those of ethyl 3-(3'-fluoro-4'-methoxy phenyl) acrylate and ethyl 3-(3',4'-methylene dioxy phenyl) acrylate. The control effects at the concentration of 0.20 mg/mL are 100%, 94.51% and 95.49%, respectively; the control effects at the concentration of 0.143 mg/mL are 97.09%, 91.16% and 95.20%, respectively; the control effects at the concentration of 0.10 mg/mL are 83.69%, 77.26% and 75.92%, respectively. Compared with the control compound A, the control effect of ethyl 3-(3', 4'-dimethoxy phenyl) acrylate is superior to that of the control compound A, the control effects of ethyl 3-(3'-fluoro-4'-methoxy phenyl) acrylate and ethyl 3-(3',4'-methylene dioxy phenyl) acrylate are comparable to that of the control compound A. However, the control effects of the three compounds and the control compound A are all inferior to the control effect of 12.5% myclobutanil EC (100%, 100% and 99.61%) at the same concentration.

TABLE 9

| Name of Agents | Concentration of Agents (mg/mL) | Average Disease Index before Application | Disease Index 10 days after the Fourth Application | Control Effect (%) |
| --- | --- | --- | --- | --- |
| 14% of ethyl 3-(3'-fluoro-4'-methoxy phenyl) acrylate EC | 0.20 | 2.98 | 2.83 | 94.51 |
| | 0.143 | | 4.55 | 91.16 |
| | 0.10 | | 11.71 | 77.26 |
| 14% of ethyl 3-(3',4'-methylene dioxy phenyl) acrylate EC | 0.20 | 2.98 | 2.09 | 95.94 |
| | 0.143 | | 2.47 | 95.20 |
| | 0.10 | | 12.40 | 75.92 |
| 10% of ethyl 3-(3',4'-dimethoxy phenyl) acrylate EC | 0.20 | 2.98 | 0.00 | 100.00 |
| | 0.143 | | 1.50 | 97.09 |
| | 0.10 | | 8.40 | 83.69 |
| 14% of the control compound A EC | 0.20 | 2.98 | 3.10 | 93.98 |
| | 0.143 | | 4.50 | 91.26 |
| | 0.10 | | 12.10 | 76.51 |
| 12.5% of myclobutanil EC | 0.20 | 2.98 | 0.00 | 100.00 |
| | 0.143 | | 0.00 | 100.00 |
| | 0.10 | | 0.20 | 99.61 |
| CK (clear water) | — | 2.98 | 51.50 | — |

Embodiment 5: In-Vivo Determination of ethyl 3-(3'-fluoro-4'-methoxy phenyl) acrylate, ethyl 3-(3',4'-methylene dioxy phenyl) acrylate, ethyl 3-(3',4'-dimethoxy phenyl) acrylate and the Control Compound A on the Control of Wheat Powdery Mildew in a Greenhouse (1) Formulation of Emulsifiable Concentrate The same as that in Embodiment 3.

(2) In-Vivo Determination Method

Winter wheat (Variety: Huixian Red) was sown in pots in a greenhouse, and inoculated with a fresh spore suspension of *Blumeria graminis* f. sp. *trilici* by spraying on its leaves and stems at the stage of 2 leaves. The first application was started at the early onset of powdery mildew. Both sides of the leaves were sprayed evenly with a small hand-held sprayer so that the leaves were wetted by the liquor without loss. 14% of ethyl 3-(3'-fluoro-4'-methoxy phenyl) acrylate EC, 14% of ethyl 3-(3',4'-methylene dioxy phenyl) acrylate EC, 10% of ethyl 3-(3',4'-dimethoxy phenyl) acrylate EC and 14% of the control compound A EC were all diluted at the concentrations of 0.20, 0.143 mg/mL (active ingredients); the control agent, 15% of triazolone WP, was also diluted at the concentrations of 0.20, 0.143 mg/mL (active ingredients), additionally clear water was used as the control. Applications were conducted every 7 days consecutively for 3 times. 10 days after the last application, the number of disease leaves at each grade of powdery mildew was investigated following the grading standard of 9 grades, to calculate the disease index and the control effect.

(3) Determination Results

It is indicated from the determination results (Table 10) that, the application of ethyl 3-(3',4'-dimethoxy phenyl) acrylate at the early onset has a good control effect on wheat powdery mildew. The control effects at the concentrations of 0.20, 0.143 mg/mL are 91.55%, 79.47% respectively, which are superior to those of ethyl 3-(3'-fluoro-4'-methoxy phenyl) acrylate and ethyl 3-(3',4'-methylene dioxy phenyl) acrylate (67.60%, 64.75% and 77.65%, 74.28%). Compared with the control compound A, the control effect of ethyl 3-(3',4'-dimethoxy phenyl) acrylate is superior to that of the control compound A, the control effect of ethyl 3-(3',4'-methylene dioxy phenyl) acrylate is comparable to that of the control compound A, and the control effect of ethyl 3-(3'-fluoro-4'-methoxy phenyl) acrylate is inferior to that of the control compound A. However, the control effects of the three compounds and the control compound A are all inferior to the control effect of 15% triazolone WP (100% and 100%) at the same concentration.

TABLE 10

| Name of Agents | Concentration of Agents (mg/mL) | Average Disease Index before Application | Disease Index 10 days after the Third Application | Control Effect (%) |
|---|---|---|---|---|
| 14% of ethyl 3-(3'-fluoro-4'-methoxy phenyl) acrylate EC | 0.20 | 2.13 | 25.69 | 67.60 |
|  | 0.143 |  | 27.95 | 64.75 |
| 14% of ethyl 3-(3',4'-methylene dioxy phenyl) acrylate EC | 0.20 | 2.13 | 17.72 | 77.65 |
|  | 0.143 |  | 20.39 | 74.28 |
| 10% of ethyl 3-(3',4'-dimethoxy phenyl) acrylate EC | 0.20 | 2.13 | 6.70 | 91.55 |
|  | 0.143 |  | 16.28 | 79.47 |
| 14% of the control compound A EC | 0.20 | 2.13 | 15.60 | 80.33 |
|  | 0.143 |  | 19.10 | 75.91 |
| 15% of triazolone WP | 0.20 | 2.13 | 0.00 | 100.00 |
|  | 0.143 |  | 0.00 | 100.00 |
| CK (clear water) | — | 2.13 | 79.29 | — |

Embodiment 6: In-Vivo Determination of the Modes of ethyl 3-(3'-fluoro-4'-methoxy phenyl) acrylate, ethyl 3-(3',4'-methylene dioxy phenyl) acrylate, ethyl 3-(3',4'-dimethoxy phenyl) acrylate and the Control Compound A on the Control of Wheat Powdery Mildew in a Greenhouse (1) Formulation of Emulsifiable Concentrate The same as that in Embodiment 3.

(2) In-Vivo Determination Method

Winter wheat (Variety: Huixian Red) was sown in pots in a greenhouse, and inoculated with a fresh spore suspension of *Blumeria graminis* f. sp. *trilici* by spraying on its leaves and stems at the stage of 2 leaves, for which one treatment was inoculation followed by application 48 h later, the control is sprayed with clear water; another treatment is application followed by inoculation 48 h later. 14% of ethyl 3-(3'-fluoro-4'-methoxy phenyl) acrylate EC, 14% of ethyl 3-(3',4'-methylene dioxy phenyl) acrylate EC, 10% of ethyl 3-(3',4'-dimethoxy phenyl) acrylate EC and 14% of the control compound A EC were all diluted at the concentrations of 0.20, 0.143 mg/mL (active ingredients); the control agent, 15% of triazolone WP (Jiangsu Sword Agrochemicals Co., Ltd.), was also diluted at the concentrations of 0.20, 0.143 mg/mL (active ingredients). Both sides of the leaves were sprayed evenly with a small hand-held sprayer so that the leaves were wetted by the liquor without loss. Applications were conducted every 7 days consecutively for 3 times. 10 days after the last application, the number of disease leaves at each grade of powdery mildew was investigated following the grading standard of 9 grades, to calculate the disease index and the control effect.

(3) Determination Results

It is indicated from the determination results (Table 11) that, from the view of the control effects on wheat powdery mildew at different concentrations, ethyl 3-(3'-fluoro-4'-methoxy phenyl) acrylate, ethyl 3-(3',4'-methylene dioxy phenyl) acrylate and ethyl 3-(3',4'-dimethoxy phenyl) acrylate have good control effects on wheat powdery mildew. The control effect at the concentration of 0.20 mg/mL is between 91.30% and 95.94%, and the control effect at the concentration of 0.143 mg/mL is between 83.77% and 87.79%; from the view of the control effects on wheat powdery mildew by different modes, for the 3 compounds at the concentrations of 0.20 and 0.143 mg/mL, the control effects for application followed by inoculation and inoculation followed by application are comparable, indicating that the 3 compounds have both protective and therapeutical effects on the control of wheat powdery mildew, and the protective and therapeutical effects are comparable. Compared with the control compound A, the control effects of the 3 compounds on powdery mildew are comparable to that of the control compound A, and the modes are also the same as that of the control compound A. The control agent, 15% of triazolone WP, has a very high control effect on wheat powdery mildew, both up to 100% at the concentration of 0.20 and 0.143 mg/mL, which has both protective and therapeutical effects on the control of wheat powdery mildew, and the protective and therapeutical effects are comparable.

TABLE 11

| Name of Agents | Concentration of Agents (mg/mL) | Modes | Disease Index 10 Days after the Third Application | Control Effect (%) |
|---|---|---|---|---|
| 14% of ethyl 3-(3'-fluoro-4'-methoxy phenyl) acrylate EC | 0.20 | Application Followed by Inoculation | 4.20 | 94.12 |
| | | Inoculation Followed by Application | 4.44 | 93.78 |
| | 0.143 | Application Followed by Inoculation | 11.59 | 83.77 |
| | | Inoculation Followed by Application | 10.74 | 84.96 |
| 14% of ethyl 3-(3',4'-methylene dioxy phenyl) acrylate EC | 0.20 | Application Followed by Inoculation | 6.21 | 91.30 |
| | | Inoculation Followed by Application | 2.90 | 95.94 |
| | 0.143 | Application Followed by Inoculation | 8.72 | 87.79 |
| | | Inoculation Followed by Application | 8.85 | 87.61 |
| 10% of ethyl 3-(3',4'-dimethoxy phenyl) acrylate EC | 0.20 | Application Followed by Inoculation | 4.80 | 93.28 |
| | | Inoculation Followed by Application | 3.45 | 95.17 |
| | 0.143 | Application Followed by Inoculation | 10.13 | 85.81 |
| | | Inoculation Followed by Application | 9.52 | 86.67 |
| 14% of the control compound A EC | 0.20 | Application Followed by Inoculation | 5.31 | 92.56 |
| | | Inoculation Followed by Application | 4.22 | 94.09 |
| | 0.143 | Application Followed by Inoculation | 9.41 | 86.82 |
| | | Inoculation Followed by Application | 10.56 | 85.21 |
| 15% of triazolone WP | 0.20 | Application Followed by Inoculation | 0.00 | 100.00 |
| | | Inoculation Followed by Application | 0.00 | 100.00 |
| | 0.143 | Application Followed by Inoculation | 0.00 | 100.00 |
| | | Inoculation Followed by Application | 0.00 | 100.00 |
| CK (clear water) | — | — | 71.42 | — |

Embodiment 7: In-Vivo Determination of Ethyl 3-(3'-Fluoro-4'-Methoxy Phenyl) Acrylate, Ethyl 3-(3',4'-methylene dioxy phenyl) acrylate, ethyl 3-(3',4'-dimethoxy phenyl) acrylate and the Control Compound A on the Control of Damping-Off of Solanceous Vegetables in a Greenhouse (1) Formulation of Emulsifiable Concentrate
The same as that in Embodiment 3.
(2) In-Vivo Determination Method
Sick soil of damping-off (*P. aphanidermatum*, *P capsici*) was collected from the fields of tomatoes, eggplants and peppers in solar greenhouse, and mixed evenly in equal proportion. Tomatoes (Variety: Song Tian Fen Yang Yang, 100 grains), eggplants (Variety: Lanza No. 2 $F_1$ long eggplant, 100 grains), pepper (Longjiao 2 $F_1$, 100 grains) were seeded quantitatively with the sick soil in pots (diameter: 15 cm) in a greenhouse, additionally with sterile vermiculite as the control (each 100 grains for determining the germination rate). 14% of ethyl 3-(3'-fluoro-4'-methoxy phenyl) acrylate EC, 14% of ethyl 3-(3',4'-methylene dioxy phenyl) acrylate EC, 10% of ethyl 3-(3',4'-dimethoxy phenyl) acrylate EC and 14% of the control compound A EC were all diluted at the concentration of 0.80 mg/mL (active ingredients); the control agents, 50% of carbendazim WP (Hebei Guanlong Agrochemicals Co., Ltd.) and 75% chlorothalonil WP (Shandong Weifang Rainbow Chemical Co., Ltd.) were also diluted at the concentration of 0.80 mg/mL (active ingredients); additionally clear water was used as the control, 200 mL liquor was filled for each pot. Mortality of seedlings was investigated after the seedlings had grown 2 true leaves, and the control effect of each treatment on damping-off was calculated. The computational formula is as below:

Mortality of Seedlings (%)=[number of survival seedlings in the seeded grains−number of seeded grains×(100%−germination rate)]/number of seeded grains×100;

Control Effect (%)=(mortality of control seedlings−mortality of treated seedlings)/mortality of control seedlings×100.

(3) Determination Results
It is indicated from the determination results (Table 12) that, for tomato damping-off, the control effect of ethyl 3-(3'-fluoro-4'-methoxy phenyl) acrylate is higher, up to 51.02%, which is superior to those of ethyl 3-(3',4'-methylene dioxy phenyl) acrylate and ethyl 3-(3',4'-dimethoxy phenyl) acrylate; compared with the control compound A, the control effect of ethyl 3-(3'-fluoro-4'-methoxy phenyl) acrylate is superior to that of the control compound A, and the control effects of ethyl 3-(3',4'-methylene dioxy phenyl) acrylate and ethyl 3-(3',4'-dimethoxy phenyl) acrylate are comparable to that of the control compound A. For eggplant damping-off, ethyl 3-(3',4'-methylene dioxy phenyl) acrylate and ethyl 3-(3',4'-dimethoxy phenyl) acrylate both have higher control effects, 53.63% and 48.71% respectively, which are superior to that of ethyl 3-(3'-fluoro-4'-methoxy phenyl) acrylate; compared with the control compound A, the control effects of ethyl 3-(3',4'-methylene dioxy phenyl) acrylate and ethyl 3-(3',4'-dimethoxy phenyl) acrylate are comparable to that of the control compound A, and the control effect of ethyl 3-(3'-fluoro-4'-methoxy phenyl) acrylate is inferior to that of the control compound A. For pepper damping-off, ethyl 3-(3',4'-dimethoxy phenyl) acrylate, ethyl 3-(3'-fluoro-4'-methoxy phenyl) acrylate and ethyl 3-(3',4'-methylene dioxy phenyl) acrylate all have higher control effects, 64.57%, 56.47% and 52% respectively; compared with the control compound A, the control effect of ethyl 3-(3',4'-dimethoxy phenyl) acrylate is superior to that of the control compound A, and the control effects of ethyl 3-(3'-fluoro-4'-methoxy phenyl) acrylate and ethyl 3-(3',4'-methylene dioxy phenyl) acrylate are slightly superior to or comparable to that of the control compound A.

It is collectively evaluated that, ethyl 3-(3',4'-dimethoxy phenyl) acrylate has a good performance on the control effect of pepper damping-off, which can be promoted and applied in the production. The control effects of the 3 compounds and the control compound A on damping-off of tomatoes, eggplants and peppers are all superior to those of the control agents, 75% of chlorothalonil WP and 50% of carbendazim WP.

TABLE 12

| Name of Solanceous Vegetables | Name of Agents | Concentration of Agents (mg/mL) | Mortality of Seedlings (%) | Control Effect (%) |
|---|---|---|---|---|
| Tomato | 14% of ethyl 3-(3'-fluoro-4'-methoxy phenyl) acrylate EC | 0.80 | 41.00 | 51.02 |
| | 14% of ethyl 3-(3',4'-methylene dioxy phenyl) acrylate EC | 0.80 | 55.00 | 34.29 |
| | 10% of ethyl 3-(3',4'-dimethoxy phenyl) acrylate EC | 0.80 | 61.70 | 26.28 |
| | 14% of the control compound A EC | 0.80 | 59.00 | 29.50 |
| | 75% of chlorothalonil WP | 0.80 | 77.00 | 8.01 |
| | 50% of carbendazim WP | 0.80 | 73.00 | 12.78 |
| | CK (clear water) | — | 83.70 | — |
| Eggplant | 14% of ethyl 3-(3'-fluoro-4'-methoxy phenyl) acrylate EC | 0.80 | 53.70 | 33.95 |
| | 14% of ethyl 3-(3',4'-methylene dioxy phenyl) acrylate EC | 0.80 | 37.70 | 53.63 |
| | 10% of ethyl 3-(3',4'-dimethoxy phenyl) acrylate EC | 0.80 | 41.70 | 48.71 |
| | 14% of the control compound A EC | 0.80 | 40.55 | 50.12 |
| | 75% of chlorothalonil WP | 0.80 | 73.00 | 10.21 |
| | 50% of carbendazim WP | 0.80 | 66.30 | 18.45 |
| | CK (clear water) | — | 81.30 | — |
| Pepper | 14% of ethyl 3-(3'-fluoro-4'-methoxy phenyl) acrylate EC | 0.80 | 36.00 | 56.47 |
| | 14% of ethyl 3-(3',4'-methylene dioxy phenyl) acrylate EC | 0.80 | 39.70 | 52.00 |
| | 10% of ethyl 3-(3',4'-dimethoxy phenyl) acrylate EC | 0.80 | 29.30 | 64.57 |
| | 14% of the control compound A EC | 0.80 | 40.46 | 51.08 |
| | 75% of chlorothalonil WP | 0.80 | 51.30 | 37.97 |
| | 50% of carbendazim WP | 0.80 | 72.70 | 12.09 |
| | CK (clear water) | — | 82.70 | — |

It is collectively evaluated according to the in-vivo determination results in a greenhouse that:
(I) The applications of ethyl 3-(3'-fluoro-4'-methoxy phenyl) acrylate, ethyl 3-(3',4'-methylene dioxy phenyl) acrylate and ethyl 3-(3',4'-dimethoxy phenyl) acrylate all have good control effects on zucchini powdery mildew at the early onset. The control effects at the concentration of 0.50 mg/mL are 97.11%, 97.93% and 98.63%, respectively; the control effects at the concentration of 0.333 mg/mL are 95.60%, 96.21% and 95.52%, respectively. Compared with the control compound A, the control effects of the 3 compounds at higher concentrations (0.50, 0.333 mg/mL) are comparable to that of the control compound A; while at lower concentrations (0.25, 0.20 mg/mL), the control effects of ethyl 3-(3',4'-dimethoxy phenyl) acrylate and ethyl 3-(3',4'-methylene dioxy phenyl) acrylate are superior to or comparable to that of the control compound A.
(II) The applications of the 3 compounds at the early onset all have good control effects on marrow bean powdery mildew. The control effects at the concentration of 0.20 mg/mL are 100%, 94.51% and 95.49%, respectively; the control effects at the concentration of 0.143 mg/mL are 97.09%, 91.16% and 95.20%, respectively. Compared with the control compound A, the control effects of the 3 compounds are all superior to or comparable to that of the control compound A.
(III) The application of ethyl 3-(3',4'-dimethoxy phenyl) acrylate at the early onset has a good control effect on wheat powdery mildew. The control effects at the concentration of 0.20, 0.143 mg/mL are 91.55%, 79.47%, respectively, which are superior to those of the other 2 compounds. Compared with the control compound A, the control effects of ethyl 3-(3',4'-dimethoxy phenyl) acrylate and ethyl 3-(3',4'-methylene dioxy phenyl) acrylate are superior to or comparable to that of the control compound A. The modes of the 3 compounds for controlling wheat powdery mildew have both protective and therapeutic effects, and the protective and therapeutic effects are comparable, which modes are the same as that of triazolone and also the same as that of the control compound.

(IV) Ethyl 3-(3'-fluoro-4'-methoxy phenyl) acrylate has a high control effect on tomato damping-off, up to 51.02%, which is superior to that of the control compound A. Ethyl 3-(3',4'-methylene dioxy phenyl) acrylate and ethyl 3-(3',4'-dimethoxy phenyl) acrylate both have high control effects on eggplant damping-off, which are 53.63% and 48.71%, respectively, comparable to that of the control compound A. The 3 compounds all have high control effects on pepper damping-off, which are 64.57%, 56.47% and 52%, respectively, superior to or comparable to that of the control compound A.

Embodiment 8 the Field Efficiency Tests of ethyl 3-(3'-fluoro-4'-methoxy phenyl) acrylate, ethyl 3-(3',4'-methylene dioxy phenyl) acrylate, ethyl 3-(3',4'-dimethoxy phenyl) acrylate and the Control Compound A Formulation of Emulsifiable Concentrate
The same as that in Embodiment 3.

8.1 the Field Efficiency Tests of ethyl 3-(3'-fluoro-4'-methoxy phenyl) acrylate, ethyl 3-(3',4'-methylene dioxy phenyl) acrylate, ethyl 3-(3',4'-dimethoxy phenyl) acrylate and the Control Compound A on the Control of Zucchini Powdery Mildew (1) The Field Efficiency Test Method
The variety of zucchini was Zaoqing F1 (manufactured by Wuwei Dadi Seed Industry Co., Ltd.), which was sown on Jul. 29, 2016. The first application was started on August 26$^{th}$, at the early onset of powdery mildew (the average disease index is 10.07). The instrument for application was Agrolex HD 400 Model hand operating knapsack sprayer, which employed a cone nozzle. Each agent was formulated into the desired concentrations according to the usage amount of the control clear water. Both sides of the leaves were sprayed evenly so that the leaves were wetted by the liquor without loss. 14% of ethyl 3-(3'-fluoro-4'-methoxy phenyl) acrylate EC, 14% of ethyl 3-(3',4'-methylene dioxy phenyl) acrylate EC, 10% of ethyl 3-(3',4'-dimethoxy phenyl) acrylate EC and 14% of the control compound A EC were all diluted at the concentration of 0.50 mg/mL (active ingredients); the control agent, 430 g/L of tebuconazole SC (manufactured by Yantai Keda Chemical Co., Ltd.), was also diluted at the concentration of 0.50 mg/mL (active ingredient), additionally clear water was used as the control. Thereafter, applications were conducted every 7 days consecutively for 4 times. 10 days after the last application, the number of disease leaves at each grade of powdery mildew was investigated for the whole plant following the grading standard of 9 grades, to calculate the disease index and the control effect.
(2) Test Results

TABLE 13

| Name of Agents | Concentration of Agents (mg/mL) | Average Disease Index before Application | Disease Index 10 days after the Fourth Application | Control Effect (%) |
| --- | --- | --- | --- | --- |
| 14% of ethyl 3-(3'-fluoro-4'-methoxy phenyl) acrylate EC | 0.50 | 10.07 | 12.19 | 85.82 |
| 14% of ethyl 3-(3',4'-methylene dioxy phenyl) acrylate EC | 0.50 | 10.07 | 12.41 | 85.56 |
| 10% of ethyl 3-(3',4'-dimethoxy phenyl) acrylate EC | 0.50 | 10.07 | 6.94 | 91.93 |
| 14% of the control compound A EC | | 10.07 | | 87.02 |
| 430 g/L of tebuconazole SC | 0.50 | 10.07 | 53.50 | 37.74 |
| clear water control | — | 10.07 | 85.94 | — |

The field efficiency test (Table 13) shows that, the application of ethyl 3-(3',4'-dimethoxy phenyl) acrylate at the early onset has a good control effect on zucchini powdery mildew. The control effect at the concentration of 0.50 mg/mL can be up to 91.93%; followed by ethyl 3-(3'-fluoro-4'-methoxy phenyl) acrylate and 14% of ethyl 3-(3',4'-methylene dioxy phenyl) acrylate, the control effects of which are 85.82% and 85.56%, respectively. Compared with the control compound A, the control effect of ethyl 3-(3',4'-dimethoxy phenyl) acrylate is better, while the control effects of ethyl 3-(3'-fluoro-4'-methoxy phenyl) acrylate and 14% of ethyl 3-(3',4'-methylene dioxy phenyl) acrylate are comparable to that of the control compound A. The control effects of the 3 compounds and the control compound A are all significantly superior to that of the control agent, 430 g/L of tebuconazole SC (37.74%).

8.2 the Field Efficiency Test of ethyl 3-(3'-fluoro-4'-methoxy phenyl) acrylate, ethyl 3-(3',4'-methylene dioxy phenyl) acrylate, ethyl 3-(3',4'-dimethoxy phenyl) acrylate and the Control Compound A on the Control of Cucumber Powdery Mildew (1) The Field Efficiency Test Method
14% of ethyl 3-(3'-fluoro-4'-methoxy phenyl) acrylate EC, 14% of ethyl 3-(3',4'-methylene dioxy phenyl) acrylate EC, 10% of ethyl 3-(3',4'-dimethoxy phenyl) acrylate EC and 14% of the control compound A EC were all diluted at the concentration of 0.50 mg/mL (liquid 2000 folds of active ingredients); the control agent, 10% of dimethomorph EW, was also diluted at the concentration of 0.50 mg/mL (liquid 2000 folds of active ingredients); the control agent, 80% of mancozeb WP, was diluted as 500 fold liquid according to the usage amount of the formulation; the control agents, 12.5% of myclobutanil EC, 25% of propiconazole EC, 430 g/L of tebuconazole SC, 10% of hexaconazole EC and 37% of difenoconazole EC, were all diluted as 1500 fold liquid according to the usage amount of the formulation; additionally clear water was used as the control. The first application was started on Jun. 15, 2018, and *E. cichoracearum* was inoculated on June 17$^{th}$ (the diseased leaves were harvested from the solar greenhouse near the military airfield at Xiaguanying town, Yuzhong County, moisturized in the greenhouse for 2 days, then shredded, and filtered over a gauze, the filtrate was sprayed onto both sides of the cucumber leaves with the cone nozzle of an electric sprayer for inoculation). The second, third and fourth applications were conducted on June 23rd, July 2nd, and July 9th respectively, the water consumptions of which were adjusted promptly according to the amount of water desired for spraying evenly onto both sides of the control leaves. 10 days after the fourth application, the number of disease leaves at each grade of powdery mildew was investigated following the grading standard of 9 grades, to calculate the disease index and the control effect.

TABLE 14

| Name of Agents | Concentration of Agents or Dilution Factor (mg/mL, Fold Liquid) | Disease Index 10 days after the Fourth Application | Control Effect (%) |
|---|---|---|---|
| 14% of ethyl 3-(3'-fluoro-4'-methoxy phenyl) acrylate EC | 0.50 | 21.57 | 78.42 |
| 14% of ethyl 3-(3',4'-methylene dioxy phenyl) acrylate EC | 0.50 | 19.05 | 80.95 |
| 10% of ethyl 3-(3',4'-dimethoxy phenyl) acrylate EC | 0.50 | 14.82 | 85.18 |
| 14% of the control compound A EC | 0.50 | 17.98 | 82.02 |
| 10% of dimethomorph EW | 0.50 | 71.10 | 28.90 |
| 80% of mancozeb WP | 500 | 0 | 100 |
| 12.5% of myclobutanil EC | 1500 | 16.30 | 83.70 |
| 25% of propiconazole EC | 1500 | 6.06 | 93.93 |
| 430 g/L of tebuconazole SC | 1500 | 14.29 | 85.71 |
| 10% of hexaconazole EC | 1500 | 5.56 | 94.44 |
| 37% of difenoconazoleEC | 1500 | 11.11 | 88.89 |
| CK (clear water) | — | 100 | — |

(2) Test Results

The test results (Table 14) show that, the application of ethyl 3-(3',4'-dimethoxy phenyl) acrylate before the onset has a good control effect on cucumber powdery mildew. The control effect at the concentration of 0.50 mg/mL can be up to 85.18%, which is comparable to the control effects of the control agent, 12.5% of myclobutanil EC, 430 g/L of tebuconazole SC and 37% of difenoconazole EC 1500 fold liquid (the amount of the formulation) (83.70%, 85.71% and 88.89%, respectively), and inferior to the control effect of the control agent, 80% of mancozeb WP 500 fold liquid (100%) as well as the control effects of 25% of propiconazole EC and 10% of hexaconazole EC 1500 fold liquid (93.93% and 94.44%, respectively), but significantly superior to the control effect of the control agent, 10% of dimethomorph EW (28.90%). Ethyl 3-(3',4'-methylene dioxy phenyl) acrylate and ethyl 3-(3'-fluoro-4'-methoxy phenyl) acrylate both have higher control effects of 80.95% and 78.42%, respectively, which are a little lower than that of ethyl 3-(3',4'-dimethoxy phenyl) acrylate, and inferior to those of the following 6 control agents: mancozeb, myclobutanil, propiconazole, tebuconazole, hexaconazole and difenoconazole, but significantly superior to that of the control agent, 10% of dimethomorph EW. Compared with the control compound A, the control effect of ethyl 3-(3',4'-dimethoxy phenyl) acrylate is better, and the control effects of ethyl 3-(3',4'-methylene dioxy phenyl) acrylate and ethyl 3-(3'-fluoro-4'-methoxy phenyl) acrylate are comparable to that of the control compound A.

The test results further show that, 12.5% of myclobutanil EC, 25% of propiconazole EC, 430 g/L of tebuconazole SC and 10% of hexaconazole EC have phytotoxicities to cucumber at the concentration of 1500 fold liquid, displaying that the leaves become dark green, the leaves become thicker and harder, internodes become shorter, and the inhibition on the growth. The 3 compounds, the control compound A and 37% of difenoconazole EC are safe for cucumber at the test doses.

It is collectively evaluated according to the field efficiency test results that:

(I) The applications of ethyl 3-(3',4'-dimethoxy phenyl) acrylate, ethyl 3-(3'-fluoro-4'-methoxy phenyl) acrylate and ethyl 3-(3',4'-methylene dioxy phenyl) acrylate at the early onset have good control effects on zucchini powdery mildew. The control effects at the concentration of 0.50 mg/mL are 91.93%, 85.82% and 85.56%, respectively. Compared with the control compound A, the control effect of ethyl 3-(3',4'-dimethoxy phenyl) acrylate is better, the control effects of ethyl 3-(3'-fluoro-4'-methoxy phenyl) acrylate and 14% of ethyl 3-(3',4'-methylene dioxy phenyl) acrylate are comparable to that of the control compound A. The control effects of the 3 compounds and the control compound A are all superior to that of a triazole fungicide, tebuconazole.

(II) The application of ethyl 3-(3',4'-dimethoxy phenyl) acrylate before the onset has a good control effect on cucumber powdery mildew. The control effect at the concentration of 0.50 mg/mL can be up to 85.18%, being comparable to those of triazole fungicide myclobutanil, tebuconazole and difenoconazole. Ethyl 3-(3',4'-methylene dioxy phenyl) acrylate and ethyl 3-(3'-fluoro-4'-methoxy phenyl) acrylate have higher control effects, which are 80.95% and 78.42%, respectively. Compared with the control compound A, the control effect of ethyl 3-(3',4'-dimethoxy phenyl) acrylate is better, the control effects of ethyl 3-(3',4'-methylene dioxy phenyl) acrylate and ethyl 3-(3'-fluoro-4'-methoxy phenyl) acrylate are comparable to that of the control compound A. The control effects of the 3 compounds and the control compound A are all superior to that of an acrylamide fungicide, dimethomorph.

(III) The 3 compounds and the control compound A are safe for zucchini and cucumber at the test doses.

Unless otherwise specified, compounds or fungicides used in the present invention are all known materials or commercial products.

What is claimed is:

1. A method of controlling a fungal disease of crops with a cinnamate compound, wherein the fungal disease is pepper downy blight and the cinnamate compound is ethyl 3-(3',4'-methylene dioxy phenyl) acrylate as an antifungal active ingredient A, further combined with antigungal active ingredient B selected from metalaxyl or hymexazol wherein the chemical structure of ethyl 3-(3',4'-methylene dioxy phenyl) acrylate is as below:

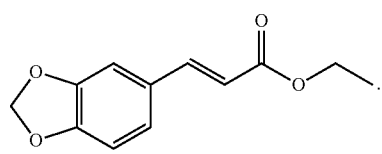 [SMILES: CCOC(=O)/C=C/c1ccc2c(c1)OCO2]

2. The method of claim 1, wherein a mass ratio of the antifungal active ingredient A to the antifungal active ingredient B is 1:3 to 3:1.

\* \* \* \* \*